United States Patent
Seo et al.

(10) Patent No.: US 8,639,102 B2
(45) Date of Patent: *Jan. 28, 2014

(54) IMAGE PROCESSING METHOD AND APPARATUS AND INFORMATION STORAGE MEDIUM STORING IMAGE INFORMATION

(71) Applicant: Samsung Electronics Co., Ltd., Gyeonggi-do (KR)

(72) Inventors: Joon-kyu Seo, Seoul (KR); Kil-su Eo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/826,165

(22) Filed: Mar. 14, 2013

(65) Prior Publication Data

US 2013/0194309 A1  Aug. 1, 2013

Related U.S. Application Data

(63) Continuation of application No. 13/324,630, filed on Dec. 13, 2011, now Pat. No. 8,422,872, which is a continuation of application No. 11/506,881, filed on Aug. 21, 2006, now Pat. No. 8,098,981.

(30) Foreign Application Priority Data

Sep. 1, 2005 (KR) .................. 10-2005-0081336

(51) Int. Cl.
  *G03B 17/18* (2006.01)
  *H04N 5/228* (2006.01)
  *G09G 5/00* (2006.01)

(52) U.S. Cl.
  USPC ........... 396/50; 396/287; 348/208.2; 345/659

(58) Field of Classification Search
  USPC ............ 396/50, 54, 287, 286, 310, 311, 296; 345/649–659; 348/208.2, 208.3, 348/208.99, 333.01, 333.06
  See application file for complete search history.

(56) References Cited

U.S. PATENT DOCUMENTS 5,227,889 A  7/1993  Yoneyama et al.
5,732,289 A  3/1998  Tsukahara et al.
(Continued)

FOREIGN PATENT DOCUMENTS

JP  10-210349 A  8/1998
JP  2000-122635 A  4/2000
(Continued)

OTHER PUBLICATIONS

Exchangeable image file format for digital still cameras: Exif Version 2.2; Established in Apr. 2002; Prepared by Technical Standardization Committee on AV & IT Storage Systems and Equipment; Published by Japan Electronics and Information Technology Industries Association; JEITA CP-3451.

*Primary Examiner* — Rochelle-Ann J Blackman
(74) *Attorney, Agent, or Firm* — Sughrue Mion, PLLC

(57) ABSTRACT

An image processing method and apparatus for automatically rotating an image and a display unit, and an information storage medium storing image information. The apparatus including a photographing unit which generates image data and a rotation sensing unit which generates rotational information of a rotation state of the photographing unit. When an object is photographed, the rotation information of the image is obtained and stored together, and when the image is displayed, the rotation is analyzed and the image and display unit are automatically rotated. When an image including moving picture information is watched, an image always optimized to be horizontal without additional work by a user can be seen.

14 Claims, 8 Drawing Sheets

(56) References Cited

U.S. PATENT DOCUMENTS

| | | |
|---|---|---|
| 5,900,909 A | 5/1999 | Parulski et al. |
| 6,148,149 A | 11/2000 | Kagle |
| 6,195,122 B1 | 2/2001 | Vincent |
| 6,262,769 B1 | 7/2001 | Anderson et al. |
| 6,348,928 B1 | 2/2002 | Jeong |
| 6,819,362 B2 | 11/2004 | Hsu |
| 6,873,357 B2 | 3/2005 | Fuchimukai et al. |
| 6,931,596 B2 | 8/2005 | Gutta et al. |
| 7,138,997 B2 | 11/2006 | Balakrishnan et al. |
| 7,170,534 B2 | 1/2007 | Son et al. |
| 7,259,772 B2 | 8/2007 | Koh |
| 7,353,069 B2 | 4/2008 | Tsai |
| 7,388,510 B2 | 6/2008 | Chu et al. |
| 8,098,981 B2 | 1/2012 | Seo et al. |
| 8,422,872 B2 * | 4/2013 | Seo et al. ............ 396/50 |
| 2004/0252200 A1 | 12/2004 | Thomas |
| 2005/0264653 A1 | 12/2005 | Starkweather et al. |
| 2006/0204232 A1 | 9/2006 | Weinberg et al. |

FOREIGN PATENT DOCUMENTS

| | | |
|---|---|---|
| JP | 2005-072734 A | 3/2005 |
| KR | 10-2004-0076515 A | 9/2004 |
| KR | 10-2004-0087574 A | 10/2004 |

* cited by examiner

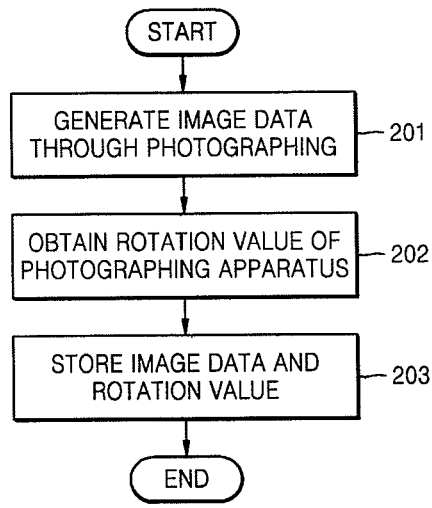
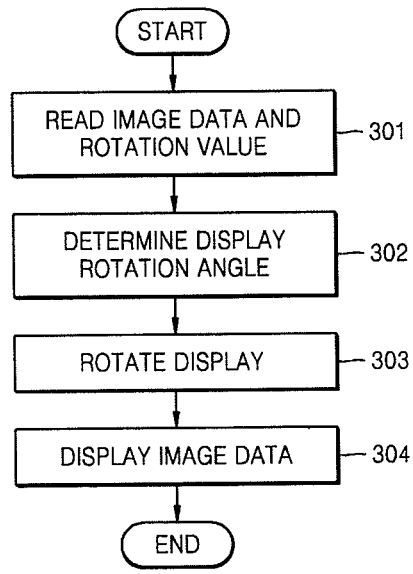

PIVOT IMAGE AND DISPLAY

PIVOT DISPLAY

PIVOT IMAGE

IMAGE PROCESSING METHOD AND APPARATUS AND INFORMATION STORAGE MEDIUM STORING IMAGE INFORMATION

CROSS-REFERENCE TO RELATED PATENT APPLICATIONS

This is a Continuation application of U.S. patent application Ser. No. 13/324,630 filed Dec. 13, 2011 which is a Continuation of U.S. patent application Ser. No. 11/506,881 filed Aug. 21, 2006, now U.S. Pat. No. 8,098,981 issued Jan. 17, 2012, which claims priority from Korean Patent Application No. 10-2005-0081336, filed on Sep. 1, 2005, in the Korean Intellectual Property Office; the disclosures of each of the prior applications are incorporated herein in their entirety by reference.

BACKGROUND OF THE INVENTION

1. Field of the Invention

The present invention relates to image processing, and more particularly, to an image processing method and apparatus for generating and displaying image information, and an information storage medium storing image information.

2. Description of the Related Art

After an image of a still or moving object is taken using a digital camera or a digital camcorder and the image is displayed on a screen, a user may notice that the acquired image is tilted. This is because the digital camera or camcorder was in a tilted position when acquiring the image and because a conventional display apparatus displays an image in a fixed position regardless of the orientation (i.e. degree of tilt, or degree of rotation) of the camera. In particular, when moving pictures are taken using a camcorder, it is almost impossible to keep the camcorder in a constant horizontal position, and therefore, the taken pictures always include unwanted rotated image data.

In the case of an analog camera, the printed photos can be easily rotated for viewing. However, in the case of a digital camera or digital camcorder, the images are viewed mainly through a display apparatus, such as a computer monitor, and it is not easy to rotate the display apparatus. Accordingly, the user cannot rotate and view the images in the same manner as printed photos.

FIG. 1 illustrates an example of displaying images photographed using a conventional photographing apparatus that was rotated in several positions. An image 101, taken when the photographing apparatus was in a horizontal position, and images 102 and 103, taken after the photographing apparatus was rotated by 30° and 110° counterclockwise, are displayed on a display apparatus 110 as images 121, 122, and 123, respectively. The image 121 does not cause any problem, but the images 122 and 123 are unpleasant for viewing. Thus, according to the conventional method of generating and displaying image information, when the photographing apparatus is tilted when a photo is taken, the tilted image may be viewed in only a tilted state.

Another problem appears when the direction of an image is different from that of a display apparatus or when the direction of a photographing apparatus is different from that of a display apparatus. An example of the former case is when a digital camera is used to take an image in landscape orientation is rotated by 90° and an image is taken in portrait orientation, and then the image is seen on a computer monitor displaying the image in landscape orientation. In this case, a user must use an editing process to rotate the image into portrait orientation, so that the image is displayed on a monitor in landscape orientation. Also, when an image having portrait orientation is seen on a landscape orientation display, the image is not properly displayed. An example of the latter case is viewing an image taken by a digital camera that takes images in landscape orientation on a portrait orientation display apparatus, such as a mobile phone. This problem is similar to that of the former case.

In order to address this problem, a method of pivoting a display apparatus after analyzing the direction of an image has been suggested. However, the performance of the pivot function in image direction analysis is quite limited, and accordingly, errors are generated when, for example, an image that should be displayed in landscape orientation is determined to have portrait orientation.

SUMMARY OF THE INVENTION

The present invention provides an image processing method and apparatus for obtaining and storing rotation information of an image when the image is taken, and automatically rotating the image on a display unit by analyzing the rotation information when the image is displayed, and an information storage medium storing image information.

According to an aspect of the present invention, there is provided an image processing method of photographing an object and generating image information, including: photographing the object by a photographing apparatus and generating image data; obtaining rotation information of the photographing apparatus when the image is taken; and storing the image data and rotation information in a memory.

The obtaining of the rotation information may include obtaining a rotation value from the gravity direction by measuring the rotation state of the photographing apparatus, when the object is photographed, with a gravity sensor.

The storing in the memory may include adding the rotation information to the header of the image data and storing the rotation information.

The generating of the image data may include photographing the object and generating moving pictures of the object, and the obtaining of the rotation information may include obtaining the rotation information of the moving pictures in a predetermined period.

According to another aspect of the present invention, there is provided an image processing method of displaying image information, including: reading image data and rotation information of the image data included in the image information; determining the rotation angle of a display unit on which the image data is output by using the rotation information; rotating the display unit by the rotation angle; and outputting the image data on the display unit.

The rotation information may include a rotation value from the gravity direction indicating the rotation state of a photographing apparatus when the image is taken, and the determining of the rotation angle may include determining an angle corresponding to the rotation value as the rotation angle.

The determining of the rotation angle may include determining the rotation angle as 0° if the absolute value of the rotation value is less than or equal to a predetermined value.

The image data may be moving picture data, the rotation information may be periodic rotation information of the moving pictures, and the determining of the rotation angle and rotating the display unit may be performed in a predetermined period.

According to still another aspect of the present invention, there is provided an image processing method of displaying image information, including: reading image data and rotation information of the image data included in the image information; determining the direction of the image data and a target direction in which the image data should be displayed by analyzing the size information and the rotation information included in the image data; if the direction of the image data is different from the target direction, rotating the image data in the target direction; if the direction of a display unit on which the image data is output is different from the target direction, rotating the display in the target direction; and outputting the rotated image data on the display unit.

The rotation information may include a rotation value from the gravity direction indicating the rotation state of the photographing apparatus when the image is taken.

The rotating of the image data may include determining that the direction of the image data is different from the target direction, if the rotation value is equal to or greater than a predetermined value, and modifying the image data to image data of the target direction.

The predetermined value may be 45°.

According to yet still another aspect of the present invention, there is provided an image processing method of photographing an object and generating and displaying image data, including: photographing the object by a photographing apparatus and generating image data; obtaining rotation information of the photographing apparatus when the image is taken; determining the rotation angle of a display unit on which the image data is output by using the rotation information; rotating the display unit by the rotation angle; and outputting the image data on the display unit.

The method may further include storing the image data and the rotation information in a memory.

According to a further aspect of the present invention, there is provided an image processing apparatus including: a memory; a photographing unit photographing an object and generating image data; a rotation sensing unit generating rotation information by measuring the rotation state of the photographing unit; and a control unit storing image information including the image data and the rotation information in the memory.

The rotation sensing unit may include a gravity sensor and obtain a rotation value of the photographing unit from the gravity direction.

The photographing unit may take moving pictures of the object and the rotation sensing unit may obtain periodically the rotation information of the photographing unit when the moving pictures are taken.

According to an additional aspect of the present invention, there is provided an image processing apparatus displaying image information including: a memory storing image information including image data and rotation information of the image; a display unit; a rotation driving unit driving the rotation of the display unit; and a control unit reading the image information from the memory, outputting the image data on the display unit, determining the rotation angle of the display unit by using the rotation information, and commanding the rotation driving unit to rotate the display unit.

The rotation information may include a rotation value indicating the rotation state from the gravity direction of a photographing apparatus when the image is taken, and the control unit may determine an angle corresponding to the rotation value as the rotation angle.

The image data may be moving picture data, the rotation information may be periodic rotation information of the moving pictures, and the control unit may determine periodically the rotation angle of the display unit and commands the rotation driving unit to rotate the display unit.

According to an additional aspect of the present invention, there is provided an image processing apparatus for generating and displaying image information, including: a memory; a photographing unit photographing an object and generating image data; a display unit; a rotation sensing unit generating rotation information by measuring the rotation state of the photographing unit when an image is taken; a rotation driving unit driving rotation of the display unit; and a control unit storing in the memory image information, including the image data and the rotation information, reading the image information from the memory, outputting the image data on the display unit, determining the rotation angle of the display unit by using the rotation information and commanding the rotation driving unit to rotate the display unit.

According to an additional aspect of the present invention, there is provided an information storage medium storing image information wherein the image information may include one or more files including image data; and rotation information of the image data.

The rotation information may include a rotation value indicating the rotation state from the gravity direction of a photographing apparatus when an image is taken.

The rotation information may be stored in the header of the file.

The image data may be moving picture data, and the rotation information may include periodic rotation information of the moving picture data.

BRIEF DESCRIPTION OF THE DRAWINGS

The above and other features and aspects of the present invention will become more apparent by describing in detail exemplary embodiments thereof with reference to the attached drawings in which:

FIG. 2 is a flowchart of operations for generating image information in an image processing method according to an exemplary embodiment of the present invention;

FIG. 3 is a flowchart of operations for rotating a display unit and displaying image information in an image processing method according to an exemplary embodiment of the present invention;

DETAILED DESCRIPTION OF THE INVENTION

Figure 1:
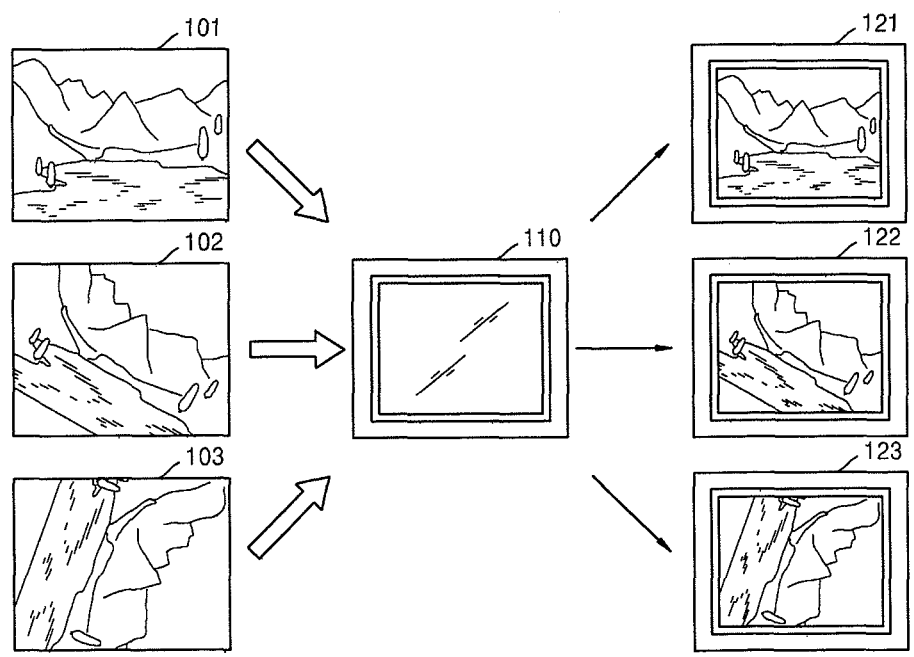
FIG. 1 illustrates an example of displaying images photographed using a conventional photographing apparatus that was rotated in several positions.

The present invention will now be described more fully with reference to the accompanying drawings, in which exemplary embodiments of the invention are shown.

FIG. 2 is a flowchart of operations for generating image information in an image processing method according to an exemplary embodiment of the present invention. A picture of an object is taken by a photographing apparatus, such as a camera or a camcorder, to generate image data in operation 201. Rotation information representing a tilted degree of the photographing apparatus is obtained in operation 202. Acquisition of rotation information can be performed by an orientation sensor, for example, a gravity sensor. When the gravity sensor is used and an image is taken by the photographing apparatus, the rotation state is measured and the rotation value can be obtained from the gravitational direction. The rotation value thus obtained is stored as the rotation information of the image in a memory together with the image data. The rotation value can be included in the header part of a file storing the image data and stored together with the image data in operation 203.

When the method is applied to an apparatus taking moving pictures, such as a camcorder, an image of an object is taken and moving picture data is generated in operation 201. The rotation information, such as a rotation value, is obtained in every frame of the moving picture or in a predetermined period in operation 202, and then the moving picture data and rotation information are added to the header part of the moving picture data and stored in a memory in operation 203. This acquisition period for recording the rotation information may be a preset value or may be set through an interface by a user.

FIG. 3 is a flowchart of operations for rotating a display unit and displaying image information in an image processing method according to an exemplary embodiment of the present invention. Referring to FIG. 3, in the image processing method of displaying image information, image data and rotation information of the image data included in the image information are first read in operation 301. In case that the rotation information is recorded in the header of the image data file, the header is parsed and the rotation information is detected. By using this rotation information, a rotation angle is determined in order to determine to which degree a display unit should be rotated to place a part that was the top part of the object, that is, the top part in the direction opposite to the gravitational direction when the image was taken, on the top on the display unit in operation 302. The rotation information of the image data may include the rotation value from the gravitational direction indicating the rotated state of the photographing apparatus when the image was taken, and the angle corresponding to this rotation value is determined as the rotation angle in the operation 302. After the rotation angle is determined, the display unit is rotated by the determined rotation angle in operation 303 and the image data is output on the display unit in operation 304.

Meanwhile, if the rotation value is negligible, the rotation of the display unit may not be needed. Accordingly, if the absolute value of the rotation value is equal to or less than a predetermined value, the display rotation angle may be determined as 0° so that the image may be displayed without rotating the display unit.

When moving picture data is displayed, the rotation information includes periodic rotation information of the moving pictures. Thus, the display unit is rotated according to the rotation angle determined in every predetermined time according to a specified period. This rotation period may be a preset value or may be set through an interface by a user.

Figure 4:
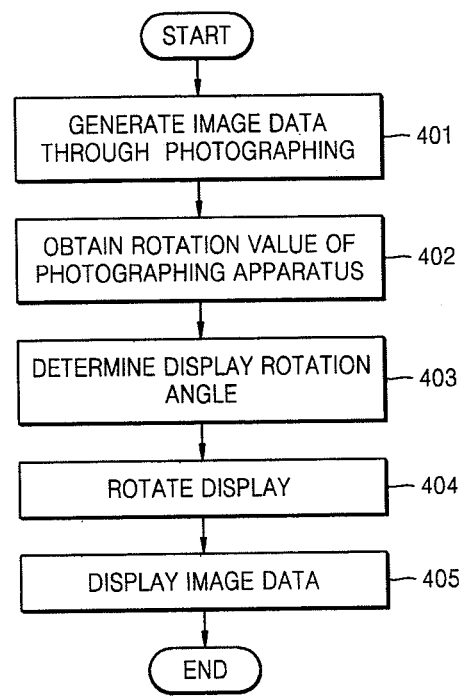
FIG. 4 is a flowchart of operations for generating and displaying image information in an image processing method according to an exemplary embodiment of the present invention.

FIG. 4 is a flowchart of operations for generating and displaying image information in an image processing method according to an exemplary embodiment of the present invention. An image of an object is taken by a photographing apparatus and the image data is generated in operation 401. The rotation information of the photographing apparatus when the image is taken is obtained in operation 402. Then, by using this rotation information, a display rotation angle to place the top part of the object when the image was taken on the top part of the display unit is determined in operation 403. After the rotation angle is determined, the display unit is rotated by the determined angle in operation 404 and the image data is output in operation 405.

Similarly to the exemplary embodiment shown in FIG. 2, the rotation state of the photographing apparatus was measured when the image was taken by using a gravity sensor to determine the rotation value, the rotation information is obtained in operation 402, and an angle corresponding to this rotation value can be determined as the rotation angle in operation 403. Also, the image data and rotation information can be stored in a memory. The rotation information may be in the header of the image data.

Figure 5:
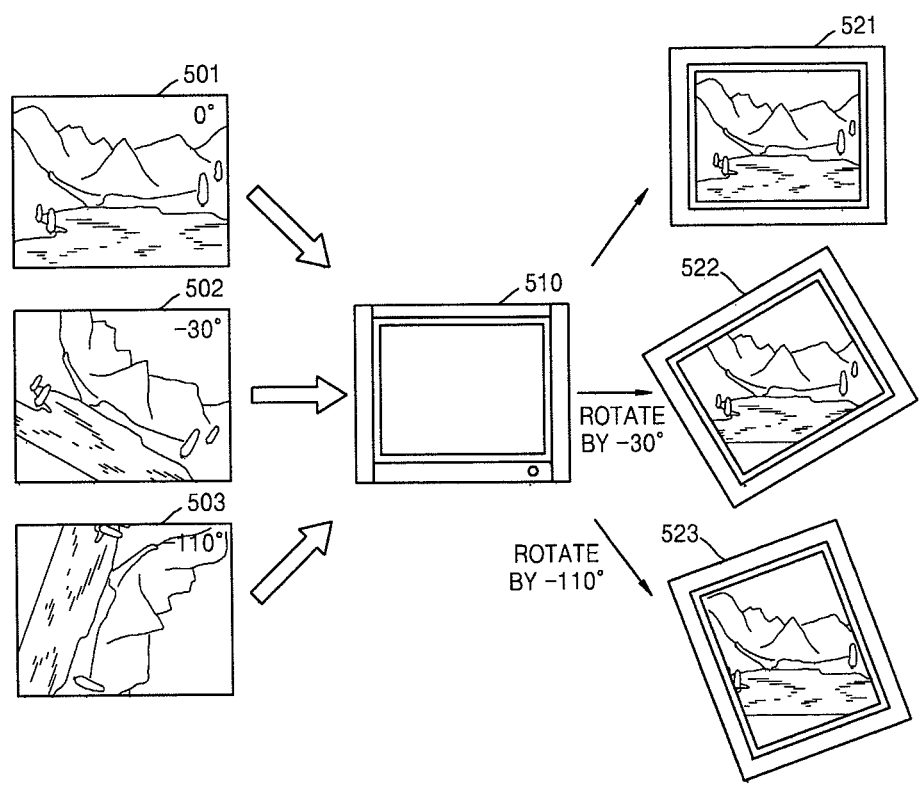
FIG. 5 illustrates an example of image information displayed by rotating a display unit according to an exemplary embodiment of the present invention.

FIG. 5 illustrates an example of image information displayed by rotating a display unit according to an exemplary embodiment of the present invention. The images in the left side of FIG. 5 are an image 501 taken in a horizontal state, and images 502 and 503 taken by rotating a camera by 30° and 110° counterclockwise. According to an exemplary embodiment of the present invention, rotation values of 0°, −30° and −110° may be recorded in the header information of these images. The result of displaying these images on a display unit 510 is shown in the right side of FIG. 5. It can be seen that when the rotation value is 0°, the image data 521 is displayed without rotating the display unit. When the rotation value is −30°, the display unit is rotated by 30° counterclockwise and then the image data 522 is displayed, and when the rotation value is −110°, the display unit is rotated by 110° counterclockwise and then the image data 523 is displayed.

Figure 6:
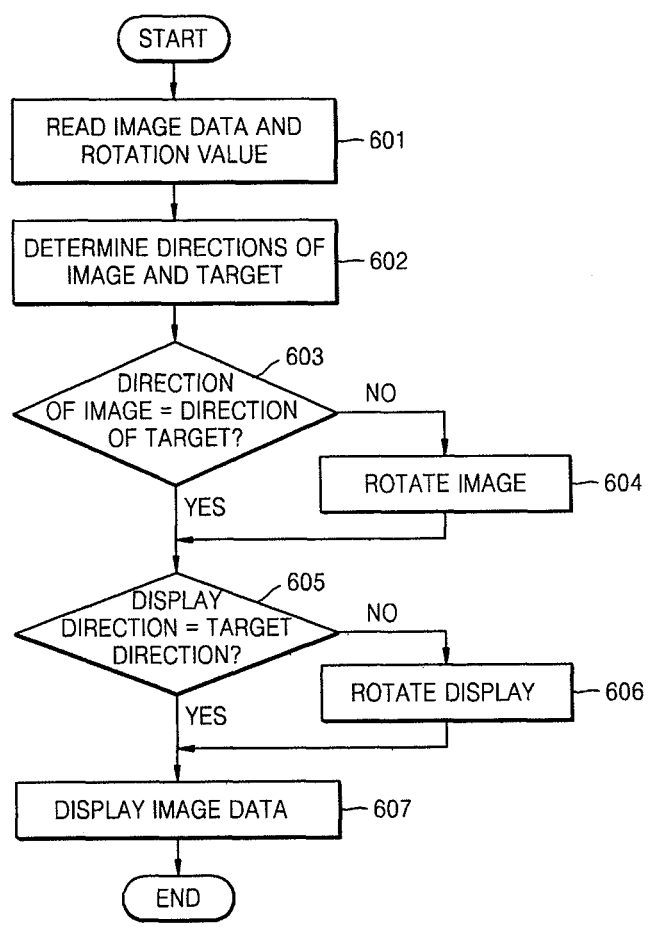
FIG. 6 is a flowchart of operations for pivoting a display unit and displaying image information in an image processing method according to an exemplary embodiment of the present invention.

FIG. 6 is a flowchart of operations for pivoting a display unit and displaying image information in an image processing method according to an exemplary embodiment of the present invention. Hereinafter, the pivoting means automatically rotating a display unit by 90° according to the orientation of an image. That is, when an image has landscape orientation, the display unit is also pivoted in the landscape orientation, and if an image has portrait orientation, the display unit is pivoted in the portrait orientation so that the image can be reproduced in an optimum state.

First, image data and rotation information of the image data included in image information are read in operation 601. By analyzing the size information and rotation information included in the image data, the direction of image data when the image was taken and a target direction in which the image should be expressed are determined in operation 602. Generally, the size of the width and length of an image is included in the header of image data, and if the width is longer than the length, it can be known that the original image is a landscape image taken by a landscape orientation photographing apparatus. However, if the absolute value of the rotation value included in the rotation information is greater than a specified value, for example, 45°, this indicates that the image was taken by tilting the landscape orientation photographing apparatus close to portrait orientation, and the appropriate displaying orientation of the image data is portrait orientation. That is, the target direction is the length direction.

The direction of the image data is compared with the target direction in operation 603, and if the directions are different, for example, when the direction of the image taken by the landscape orientation photographing apparatus is landscape orientation and the target direction is portrait orientation because the image was taken by rotating the photographing apparatus by 90°, it is needed to rotate the image in the target direction before displaying the image. In other words, if the rotation value is equal to or greater than a specified value, it is determined that the direction of the image data is different from the target direction and the original image data is modified to the image data of the target direction and pivoted in operation 604.

Next, the direction of a display unit is compared with the target direction in operation 605. If the directions are different, for example, when the image should be displayed in portrait orientation and the display apparatus is a landscape orientation computer monitor, the display unit is rotated in portrait orientation that is the target direction in operation 606.

If it is thus determined whether or not to rotate the display unit and the rotation is performed, the image data is output to the display apparatus in operation 607. When the image is rotated, the modified image data with the changed direction is displayed.

Figure 7A:
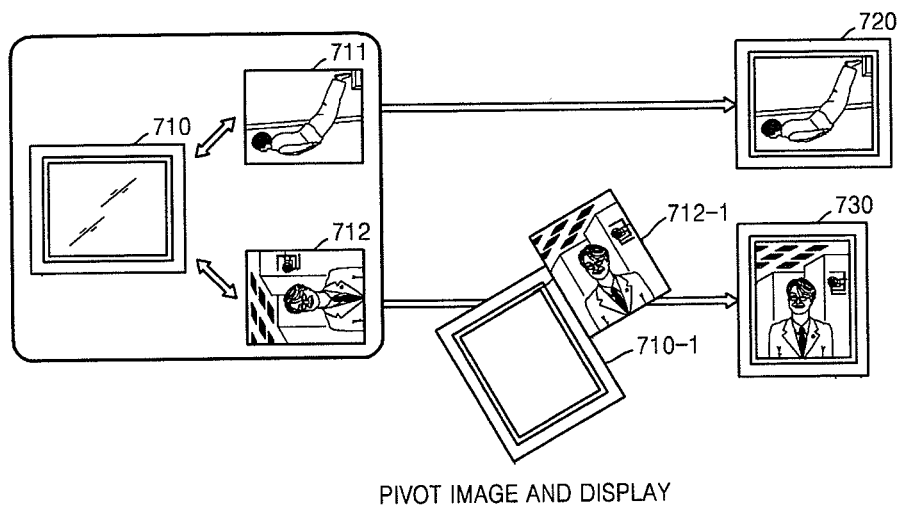
FIGS. 7A and 7B illustrate examples of image information displayed by pivoting a display unit according to an exemplary embodiment of the present invention.
Figure 7B:
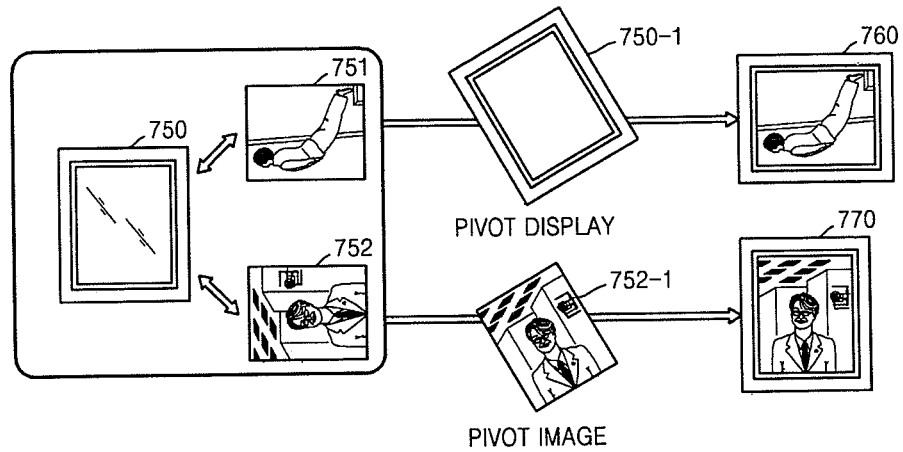

FIGS. 7A and 7B illustrate examples of image information displayed by pivoting a display unit according to an exemplary embodiment of the present invention.

The example of FIG. 7A is the result of displaying images on a landscape orientation display unit 710. When the direction of the image data 711 corresponds to landscape orientation and the rotation value is also 0° (less than a specified angle), and therefore the target direction also corresponds to landscape orientation, the image data 711 is displayed on the display unit 710 that is not rotated, as shown in 720. However, when the direction of the image data 712 corresponds to landscape orientation and the rotation value is 90° (greater than the specified angle), it can be seen that both the image data 712 and the display unit 710 are pivoted and then the pivoted image data 712-1 is displayed in portrait orientation on the pivoted display unit 710-1, as shown in 730.

The example of FIG. 7B is the result of displaying images on a portrait orientation display unit 750. When the direction of the image 751 corresponds to landscape orientation and the rotation value is 0°, the display unit 750 is pivoted in landscape orientation, and the image 751 is displayed in landscape orientation on the pivoted display unit 750-1, as shown in 760. Meanwhile, when the direction of the image 752 corresponds to landscape orientation and the rotation value is 90°, the target direction of the image corresponds to portrait and therefore, the image 752 is rotated and then, the rotated image 752-1 is displayed as shown in 770.

Figure 8:
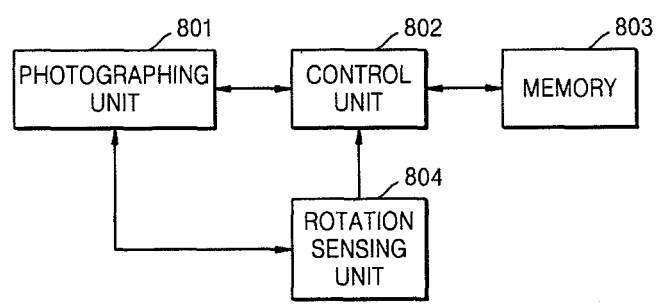
FIG. 8 is a block diagram of the structure of an image processing apparatus for generating image information according to an exemplary embodiment of the present invention.

FIG. 8 is a block diagram of the structure of an image processing apparatus for generating image information according to an exemplary embodiment of the present invention. The image processing apparatus includes a memory 803, a photographing unit 801 photographing an object and generating image data, a rotation sensing unit 804 measuring the rotation state of the photographing unit and generating rotation information, and a control unit 802 storing image information, including the image data generated in the photographing unit 801 and the rotation information generated in the rotation sensing unit 804, in the memory 803 and controlling the apparatus.

The rotation sensing unit 804 includes a gravity sensor (not shown) and obtains the rotation value from the gravity direction by measuring the rotation state of the photographing unit 801 when an image is taken. The rotation value may be stored as the rotation information in the memory 803 together with the image data. Meanwhile, the photographing unit 801 can be a unit for taking moving pictures of an object, and in this case, the rotation sensing unit 804 obtains the rotation information of the photographing apparatus periodically while the moving pictures are taken.

Figure 9:
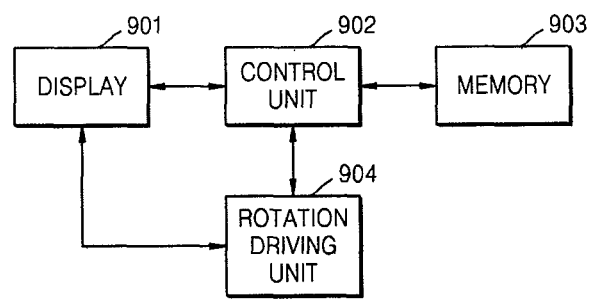
FIG. 9 is a block diagram of the structure of an image processing apparatus for displaying image information according to an exemplary embodiment of the present invention.

FIG. 9 is a block diagram of the structure of an image processing apparatus for displaying image information according to an exemplary embodiment of the present invention. The image processing apparatus includes a memory 903 storing image information including image data and rotation information of the image, a display unit 901 capable of rotating, a rotation driving unit 904 driving the rotation of a display unit, and a control unit 902 controlling the apparatus, including reading image information from the memory 903, displaying image data on the display unit 901, determining the rotation angle of the display unit 901 by using rotation information, and command the rotation driving unit 904 to rotate the display unit 901. This structure can be applied to a variety of display apparatuses and the examples include wall-mount TVs, monitors, and electronic picture frames, and portable multimedia players (PMPs), personal digital assistants (PDAs), TVs, monitors, and electronic frames using a cradle and a support.

The rotation information can include a rotation value indicating the rotation state of a photographing apparatus from the gravity direction when an image is taken, and in this case, the control unit 902 determines the angle corresponding to the rotation value as the rotation angle, and commands the rotation driving unit 904 to rotate the display unit 901 by the determined angle. When the image data to be displayed is moving picture data, the rotation information may be periodic rotation information of the photographing apparatus while the moving pictures are taken, and in this case, the control unit 902 determines the rotation angle of the display unit periodically and commands the rotation driving unit 904 to rotate the display unit 901 by the determined angle.

Figure 10:
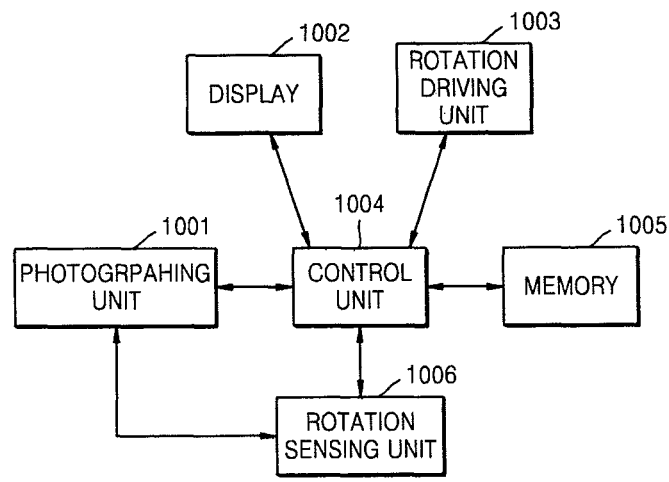
FIG. 10 is a block diagram of an image processing apparatus for generating and displaying image information according to an exemplary embodiment of the present invention.

FIG. 10 is a block diagram of an image processing apparatus for generating and displaying image information according to an exemplary embodiment of the present invention. The image processing apparatus includes a memory 1005 storing information, a photographing unit 1001 photographing an object and generating image data, a display unit 1002 capable of rotating and reproducing image data, a rotation sensing unit 1006 measuring the rotation state of the photographing unit 1001 when an image is taken and generating rotation information, a rotation driving unit 1003 driving the rotation of the display unit 1002, and a control unit 1004 storing in the memory 1005 image information, including the image data generated in the photographing unit 1001 and the rotation information measured in the rotation sensing unit 1006, reading image information from the memory 1005, displaying image data on the display unit 1002, determining the rotation angle of the display unit 1002 by using rotation information and commanding the rotation driving unit 1003 to rotate the display unit 1002.

The rotation sensing unit 1006 includes a gravity sensor (not shown) and can obtain the rotation value of the photographing unit 1001 from the gravity direction when an image is taken, and in this case, the control unit 1004 determines an angle corresponding to the rotation value as the rotation angle. When the photographing unit 1001 is a unit for taking moving pictures of an object, the rotation sensing unit 1006 obtains the rotation information of the moving pictures in each specified period, and the control unit 1004 also determines the rotation angle of the display unit 1002 periodically and commands the rotation driving unit 1003 to rotate the display unit 1002. The period for obtaining the rotation information and the rotation period of the display unit 1002 may be a preset value or may be set by the user through an interface (not shown) and may not be an identical value.

Figure 11:
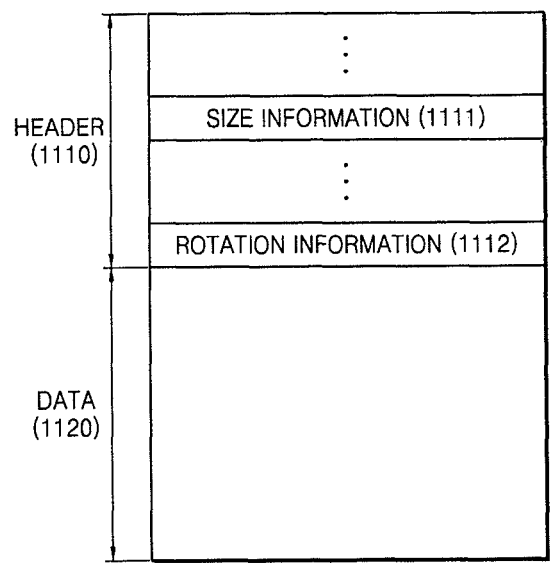
FIG. 11 illustrates an example of the structure of image data including rotation information according to an exemplary embodiment of the present invention.

FIG. 11 illustrates an example of the structure of image information stored in an information storage medium according to an exemplary embodiment of the present invention. In the information storage medium according to the present invention one or more files including image data and rotation information a photographing apparatus when the image was taken are recorded. This rotation information may be a rotation value indicating the rotation state of the photographing apparatus from the gravity direction when the image was taken. Also, as shown in FIG. 11, the image data can be formed with a data part 1120 and a header part 1110 including the size information 1111 of the image, and the rotation information 1112 may be recorded as a part of this header.

When the image data stored in the information storage medium according to the present invention is moving picture data, the rotation information includes periodic rotation information of the moving picture data and can be added to the header and recorded in the same manner as in the still images.

According to the structure of the present invention as described above, a display unit is automatically tilted as much as a photographing apparatus, such as a camera or a camcorder, was tilted when a photo or moving pictures were taken, and then the image is reproduced such that the user can always view the image in a horizontal state. Also, even when the direction of a photographing apparatus is different from the direction of an image, the display unit is automatically rotated and displays the image such that the user can always view an optimal image.

What is claimed is:

1. An image processing method of displaying image information comprising:
    reading image data and rotation information including a rotation value of the image data included in a header of the image data;
    determining a rotation angle of a display unit on which the image data is output using the rotation information;
    rotating the display unit by the rotation angle; and
    outputting the image data on the display unit,
    wherein the rotation angle is determined to be 0° if the rotation value is less than or equal to a predetermined value.

2. The method of claim 1, wherein the rotation value is based on the gravitational direction indicating a rotation state of a photographing apparatus that generated the image data, and the determining of the rotation angle comprises determining an angle corresponding to the rotation value as the rotation angle.

3. The method of claim 1, wherein the image data is moving picture data and the determining of the rotation angle and rotating the display unit are performed intermittently.

4. The method of claim 3, wherein the determining the rotation angle and rotating the display unit are performed periodically.

5. An image processing method of displaying image information comprising:
    reading image data and rotation information of the image data included in a header of the image data;
    determining a direction of the image data and a target direction of displaying the image data by analyzing size information and the rotation information indicating a rotation value of the image data;
    rotating the image data based on a comparison between the target direction and the direction of the image data;
    rotating the display based on a comparison between the target direction and a direction of a display unit on which the image data is output; and
    outputting the rotated image data on the display unit,
    wherein the rotating of the image data comprises determining that the direction of the image data is different from the target direction when the rotation value is equal to or greater than a predetermined value, and modifying the image data to image data of the target direction.

6. The method of claim 5, wherein the rotation value determined from the gravity direction indicating the rotation state of the photographing apparatus when the image is taken.

7. The method of claim 5, wherein the predetermined value is 45°.

8. An image processing apparatus comprising:
    a photographing unit which photographs an object and generates image data;
    a rotation sensing unit which generates rotation information including a rotation angle by measuring the rotation state of the photographing unit; and
    a control unit which adds the rotation information to a header of the image data and stores the image data with the header including the rotation information in a memory,
    wherein the rotation angle is determined to be 0° if a value of the measured rotation states is less than or equal to a predetermined value.

9. The image processing apparatus according to claim 8, wherein the rotation angle is determined from a gravity direction indicating the rotation state of the photographing apparatus when the image is taken.

10. The image processing apparatus according to claim 8, wherein the predetermined value is 45°.

11. An image processing apparatus which generates and displays image information, comprising:
    a photographing unit which photographs an object and generates image data;
    a rotation sensing unit which generates rotation information by measuring the rotation state of the photographing unit;
    a rotation driving unit which drives rotation of a display unit; and
    a control unit which adds the rotation information to a header of the image data, stores in a memory image information, including the image data with the header including the rotation information, reads the image information from the memory, outputs the image data on the display unit, determines a rotation angle of the display unit by using the rotation information and commands the rotation driving unit to rotate the display unit,
    wherein the rotation angle is determined to be 0° of a value of the rotation information is less than a predetermined value.

12. The image processing apparatus according to claim 11, wherein the value of the rotation information is determined from a gravity direction indicating the rotation state of the photographing apparatus when the image is taken.

13. The image processing apparatus according to claim 11, wherein the predetermined value is 45°.

14. An image processing apparatus comprising:
a control unit which reads image data and rotation information of image data included in a header of the image data stored in a memory and determines a direction of the image data and a target direction of displaying the image data by analyzing size information and the rotation information indicating a rotation value of the image data;
a rotation driving unit which rotates the image data based on a comparison between the target direction and the direction of the image data and which rotates a display based on a comparison between the target direction and a direction of a display unit on which the image data is output; and
a display which outputs the rotated image data on the display unit,
wherein the rotating of the image data comprises determining that the direction of the image data is different from the target direction when the rotation value is equal to or greater than a predetermined value, and modifying the image data to image data of the target direction.

* * * * *